United States Patent
Megner et al.

(10) Patent No.: US 10,975,788 B2
(45) Date of Patent: Apr. 13, 2021

(54) METHOD FOR CONTROLLING AN ENGINE IN A MOTOR VEHICLE

(71) Applicant: Dr. Ing. h.c. F. Porsche Aktiengesellschaft, Stuttgart (DE)

(72) Inventors: Joerg Megner, Ludwigsburg (DE); Benjamin Blatter, Wiernsheim-Serres (DE); Dominik Kohl, Pforzheim (DE); Ulrich Franz Uhlirsch, Blaustein-Herrlingen (DE); Matthias Brandl, Rottenburg am Neckar (DE); Christoph Mell, Stuttgart (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 16/677,702

(22) Filed: Nov. 8, 2019

(65) Prior Publication Data
US 2020/0158040 A1 May 21, 2020

(30) Foreign Application Priority Data
Nov. 21, 2018 (DE) ...................... 10 2018 129 259.7

(51) Int. Cl.
*F02D 41/02* (2006.01)
*F02D 41/14* (2006.01)
*G01M 1/10* (2006.01)

(52) U.S. Cl.
CPC ....... *F02D 41/0215* (2013.01); *F02D 41/022* (2013.01); *F02D 41/1401* (2013.01); *G01M 1/10* (2013.01); *F02D 2041/1409* (2013.01); *F02D 2200/101* (2013.01); *F02D 2200/1002* (2013.01); *F02D 2250/21* (2013.01)

(58) Field of Classification Search
None
See application file for complete search history.

(56) References Cited

U.S. PATENT DOCUMENTS

| | | | | |
|---|---|---|---|---|
| 5,944,765 A * | 8/1999 | Saito | ..................... | B60W 10/06 477/109 |
| 6,027,425 A * | 2/2000 | Sakaguchi | ............ | B60W 10/06 477/111 |
| 6,959,691 B2 * | 11/2005 | Ueda | ..................... | F02D 31/003 123/339.19 |

(Continued)

FOREIGN PATENT DOCUMENTS

| DE | 10206199 C1 * | 12/2002 | ............ | F02P 5/1504 |
|---|---|---|---|---|
| DE | 10206199 C1 | 12/2002 | | |

(Continued)

*Primary Examiner* — Kevin R Steckbauer
(74) *Attorney, Agent, or Firm* — Leydig, Voit & Mayer, Ltd.

(57) ABSTRACT

A method for controlling an engine in a motor vehicle includes determining a theoretical inertia of a drivetrain during a change of an operating mode of the engine, detecting an actual inertia in the drivetrain during the change of the operating mode, and increasing a rotational speed of the engine in response to detecting the actual inertia. The method further includes detecting an inertia overcome, determining a difference between the theoretical inertia and the inertia overcome, and reducing the rotational speed of the engine if the difference becomes less than a threshold value.

16 Claims, 1 Drawing Sheet

(56) References Cited

U.S. PATENT DOCUMENTS

| | | | | |
|---|---|---|---|---|
| 7,610,799 B2* | 11/2009 | Sugita | | G01M 15/044 73/114.15 |
| 8,447,491 B2* | 5/2013 | Templin | | B60W 30/20 701/99 |
| 8,589,051 B2* | 11/2013 | Kuwahara | | F02D 35/0007 701/102 |
| 9,037,329 B2* | 5/2015 | Nefcy | | B60L 15/20 701/22 |
| 9,873,422 B2* | 1/2018 | Yamazaki | | B60W 20/15 |
| 9,878,720 B2* | 1/2018 | Tunhag | | B60W 30/20 |
| 10,036,339 B2* | 7/2018 | Evaldsson | | B60W 50/06 |
| 10,077,042 B2* | 9/2018 | Reed | | F16H 63/50 |
| 10,106,145 B2* | 10/2018 | Reed | | B60W 20/15 |
| 10,126,202 B2* | 11/2018 | Tian | | G01M 13/025 |
| 10,300,919 B2* | 5/2019 | Redbrandt | | B60W 30/20 |
| 10,344,695 B1* | 7/2019 | Bergstedt | | F02D 41/1402 |
| 10,508,736 B2* | 12/2019 | Cho | | F16H 61/688 |
| 10,655,551 B2* | 5/2020 | Shawe | | F02B 33/34 |
| 2005/0022782 A1* | 2/2005 | Ueda | | F02D 41/1497 123/339.19 |
| 2009/0100919 A1* | 4/2009 | Sugita | | F02D 41/1497 73/114.15 |
| 2010/0262352 A1* | 10/2010 | Kuwahara | | F02D 35/0007 701/102 |
| 2012/0101705 A1* | 4/2012 | Templin | | B60W 30/20 701/99 |
| 2013/0297110 A1* | 11/2013 | Nefcy | | B60L 15/20 701/22 |
| 2015/0345413 A1* | 12/2015 | Shawe | | F02B 33/34 123/559.3 |
| 2015/0360694 A1* | 12/2015 | Tunhag | | B60W 10/04 701/99 |
| 2017/0074753 A1* | 3/2017 | Tian | | G01M 13/025 |
| 2017/0184039 A1* | 6/2017 | Evaldsson | | B60W 50/06 |
| 2017/0197629 A1* | 7/2017 | Redbrandt | | F02D 41/1497 |
| 2017/0327102 A1* | 11/2017 | Yamazaki | | F02D 41/0215 |
| 2017/0355360 A1* | 12/2017 | Reed | | B60K 6/387 |
| 2017/0355362 A1* | 12/2017 | Reed | | B60K 6/48 |
| 2018/0072306 A1* | 3/2018 | Yamazaki | | B60W 10/06 |
| 2019/0170250 A1* | 6/2019 | Cho | | F16H 61/688 |

FOREIGN PATENT DOCUMENTS

| | | | | |
|---|---|---|---|---|
| DE | 102006039678 A1 * | 2/2008 | | F02D 41/1497 |
| DE | 102006039678 A1 | 2/2008 | | |
| DE | 102012011756 A1 * | 12/2013 | | B60W 30/20 |
| DE | 102012011756 A1 | 12/2013 | | |

* cited by examiner

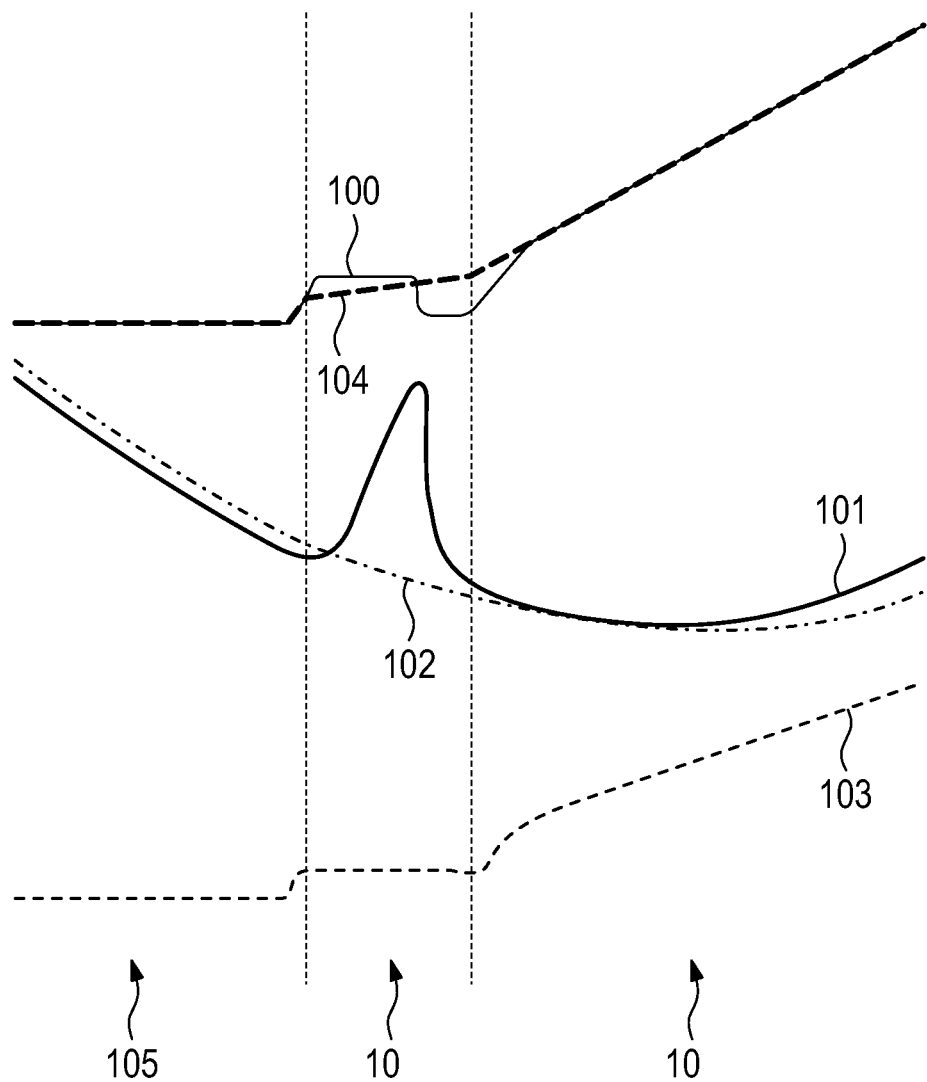

METHOD FOR CONTROLLING AN ENGINE IN A MOTOR VEHICLE

CROSS-REFERENCE TO PRIOR APPLICATIONS

This application claims benefit to German Patent Application No. DE 10 2018 129 259.7, filed on Nov. 21, 2018, the entire disclosure of which is hereby incorporated by reference herein.

FIELD

The invention relates to a method for controlling an engine in a motor vehicle, wherein the engine is connected to at least one axle of the motor vehicle via a drivetrain.

BACKGROUND

During operation, the engine of a motor vehicle may have two different operating modes. In traction mode, the engine drives an axle of the motor vehicle via a drivetrain. In coasting mode, the engine is coupled to the axle via the drivetrain and is driven by the axle, which is already in rotation. The coasting mode occurs for example when the motor vehicle has been accelerated to a speed and the driver lets off the gas pedal and the motor vehicle rolls without the clutch being disengaged.

When changing between coasting mode and traction mode, gear wheels in the transmission and other coupling elements, for example side shafts and the dual-mass flywheel, must undergo a certain amount of inertia. The reason for the inertia is for example that, after the changing of the operating mode, a driving gear wheel becomes a driven gear wheel, and vice versa. The flanks of the gear teeth lying against one another therefore change. This results in an uncomfortable jolt and disturbing mechanical noises, which are also referred to as clunking of the drivetrain.

Furthermore, for example when changing from coasting mode to traction mode, that is to say when the driver is not actuating the gas pedal at first (coasting mode) and then actuates the gas pedal (traction mode) with the clutch engaged, the rotational speed of the engine increases further although the rotational speed on the output side of the transmission is not increased, since the inertia first has to take place. Therefore, after the inertia has taken place, the flanks of the teeth of the gear wheels meet one another at significantly different rotational speeds. In this case, a moment of inertia, resulting from reducing the difference in rotational speed, and the current coupling moment are abruptly introduced to the drive output. This causes an uncomfortable jolting in the passenger compartment of the motor vehicle.

SUMMARY

In an embodiment, the present invention provides a method for controlling an engine in a motor vehicle. The engine is connected to at least one axle of the motor vehicle via a drivetrain. The method includes determining a theoretical inertia of the drivetrain during a change of an operating mode of the engine, detecting an actual inertia in the drivetrain during the change of the operating mode, and increasing a rotational speed of the engine in response to detecting the actual inertia. The method further includes detecting an inertia overcome, determining a difference between the theoretical inertia and the inertia overcome, and reducing the rotational speed of the engine if the difference becomes less than a threshold value.

BRIEF DESCRIPTION OF THE DRAWINGS

The present invention will be described in even greater detail below based on the exemplary FIGURE. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawing which illustrates the following:

The single FIGURE shows a schematic graphic representation of the variation of different parameters when carrying out a method according to an embodiment of the invention.

DETAILED DESCRIPTION

Embodiments of the invention provide methods for controlling an engine in a motor vehicle that reduce undesirable noises and jolting movements. In addition, embodiments of the invention provide motor vehicles with an engine configured to be controlled pursuant to such a method.

The engine is connected to an axle of the motor vehicle via a drivetrain, which may also comprise a transmission. First, a theoretical inertia of the drivetrain during a change of the operating mode of the engine, for example from coasting mode to traction mode, is determined. This determination may be performed for example by the theoretical inertia being read from a data memory. It may have been stored there beforehand—for example during the production of the motor vehicle. The theoretical inertia is made up of many individual inertias of the various components of the drivetrain. It may for example be given in degrees. If, therefore, an inertia of 2° is given for example, the inertia can be overcome after rotation of the crankshaft by 2°.

Furthermore, an actual inertia in the drivetrain during a change of the operating mode is detected. It should be noted here that this is merely the detection of an event and not a quantification of the actual inertia. When the actual inertia has been detected, the rotational speed of the engine is accelerated. This has the advantage that the inertia is overcome more quickly and the power of the engine is available to the driver more quickly for driving the motor vehicle.

An inertia overcome is also detected. This is part of the overall inertia that has already been undergone. A difference between the inertia overcome and the theoretical inertia is determined. The difference may for example be absolute. In this case, the difference is the difference between the theoretical inertia and the inertia overcome. It is also possible that the difference is relative. In this case, the difference is the ratio between the theoretical inertia and the inertia overcome.

The rotational speed of the engine is reduced if the difference becomes less than a first threshold value. Reducing the rotational speed has the advantage that the rotational speeds of the flanks of the gear teeth engaging one another after the inertia has been undergone completely differ less than when the rotational speed of the engine is relatively high.

Methods according to the invention can consequently offer at least the following two important advantages. On the one hand, as a result of the acceleration of the rotational speed of the engine, the inertia is undergone particularly quickly and the motor vehicle can accelerate smoothly. On the other hand, undesired disturbing noises and jolting are reduced, since the rotational speed of the engine is reduced when the inertia has been undergone almost completely.

According to one embodiment of the invention, when reducing the rotational speed of the engine, the rotational speed of the engine can be adapted to an output speed of the drivetrain. The output speed is understood here in the context of this description as meaning in particular the rotational speed of the components of the drivetrain on the output side of the transmission. The transmission has in this case an input side, which is driven by the engine, and an output side, via which the torque produced by the engine is output to the axle to be driven.

The adaptation to the output speed is advantageous in particular to reduce the intensity of undesired noises and jolting.

According to one embodiment of the invention, the rotational speed of the engine can be accelerated and/or reduced in dependence on the difference. For example, the rotational speed may be increased particularly strongly if the difference is relatively great and increased less strongly if the difference is smaller. The reduction of the rotational speed may likewise be initially performed more strongly. The smaller the difference becomes, the smaller the reduction may also become. In this way it is possible to achieve the effect that the beginning of the acceleration of the motor vehicle after the inertia has been overcome is particularly pleasant and comfortable.

According to one embodiment of the invention, the actual inertia may be obtained by a comparison of a gradient of an input speed with a gradient of the output speed. In this case, the output speed is understood as meaning the rotational speed on the output side of the transmission. If these gradients deviate from one another by more than a second threshold value, the actual inertia is detected.

When comparing the gradients, it is advantageous to make allowance for elastic components in the drivetrain, since the effects occurring on these components coincide with the actual inertia and may lead to an erroneous detection in dynamic load changes.

According to one embodiment of the invention, the drivetrain may comprise a transmission. For determining the gradient of the input speed, the input speed may be detected on the basis of a transmission input speed when the transmission is in a slipping state. The transmission input speed is understood in the context of this description as meaning in particular the rotational speed of the components on the input side of the transmission. A slipping state of the transmission is understood in the context of this description as meaning in particular when two frictional elements in contact with one another have different rotational speeds. In this way, allowance is made for components with dynamic inertia, for example a dual-mass flywheel. Embodiments of the invention can also be applied to hydrodynamic converters.

According to one embodiment of the invention, for determining the gradient of the input speed, the input speed is detected on the basis of the rotational speed of the engine when the transmission is in a non-slipping state.

According to one embodiment of the invention, the theoretical inertia may be determined in dependence on an engaged gear of the transmission of the drivetrain. As a result of the different transmission ratios in the transmission according to the gear engaged, inertias that exist before and after the transmission are likewise transmitted correspondingly. Allowance can be made for this effect by the gear-dependent determination of the theoretical inertia.

According to one embodiment of the invention, during the acceleration and/or during the reduction of the rotational speed of the engine, pre-setpoint values may be determined by a pre-control and subsequently converted into setpoint values by a PID controller. In the context of this description, a PID controller is in this case in particular a controller with a proportional gain, a time integration and allowance for a rate of change of a system deviation of the pre-setpoint values.

According to one embodiment of the invention, the actual inertia may only be detected when the torque transmitted by the engine lies within a torque range, for example a gear-dependent torque range. In this way, incorrect detections can be avoided.

Apart from the engine, the drivetrain and the axle, the motor vehicle also comprises a controller, which is designed to carry out a method according to an embodiment of the invention. For example, instructions that cause the controller to carry out a method according to an embodiment of the invention may be stored in a digital storage medium.

The single FIGURE shows a schematic graphic representation of the variation of different parameters when carrying out a method according to an embodiment of the invention. It is intended that a setpoint value for a torque to be output by the engine represented as graph 100, an input speed represented as graph 101, an output speed represented as graph 102, a longitudinal acceleration of the motor vehicle represented as graph 103 and a correction of the setpoint value for the torque to be output by the engine represented as graph 104 are shown. The graph 100 in this case represents the setpoint value that is obtained as a result of the actuation of the gas pedal by the driver, while the graph 104 represents the correction of this particular setpoint value by the method according to an embodiment of the invention. The graphs 101, 102 and 103 are obtained during the correction of the setpoint value.

The representation is divided into a first region 105, a second region 106 and a third region 107. The second region 106 may in this case also be referred to as a transient region. In it, the inertia takes place. The inertia occurs because the operating mode of the engine is changed from coasting mode in the first region 105 to traction mode in the third region 107.

It can be seen from the variation of the input speed 101 that, when the inertia occurs, it rises very strongly, while the output speed 102 continues to fall. This can be explained by the fact that the engine is only driving the input side of the transmission and is not yet transmitting any torque to the axle. Therefore, there is also no longitudinal acceleration 103.

When the graph 104 is considered, it is evident that the rotational speed of the engine is initially increased more strongly than in the prior art. This takes place in order that the inertia is undergone as quickly as possible and the driver is enabled to accelerate the motor vehicle as smoothly as possible. If the difference between the inertia undergone and the theoretical inertia is then smaller than a threshold value, the rotational speed of the engine is reduced, in order to avoid jolting when the inertia has been undergone completely.

For pre-controlling the torque of the engine for undergoing the inertia, various parameters that describe the geometrical inertia are used. This may be for example a variation of the difference in rotational speed in dependence on a dynamic response of the rotational speed during the detection of the actual inertia and the relative difference between the theoretical inertia and the inertia overcome. Alternatively or in addition, a variation of the gradient of the difference in rotational speed in dependence on the same parameters may be used. It is also possible to use a direct variation of the torque in dependence on the same parameters.

The derivative of the variation of the difference in rotational speed and the variation of the gradient of the difference in rotational speed can be transformed into a variation of the torque for the pre-control on the basis of an inertia equation.

In order only to obtain settable moments from the pre-control, it is restricted to the current setting limits of the system. The values output by the pre-control may be subsequently controlled by a PID controller, in order to arrive at the graph 104 shown in FIG. 1. In order to create for the PID controller reserves for adjusting the achievable setpoint speed differential, an offset may be used to allow for these reserves. Specific values for the offset may be adapted motor-vehicle-dependently.

The determination of the speed reversal point is performed automatically by the calculation with inclusion of the pre-control and can be shifted by a safety factor, so that the rotational speed is reduced earlier than is actually necessary. The speed reversal point is in this case the point at which the input speed is no longer increased but is reduced. The speed reversal point is calculated from the ratio of the pre-control moments, that is to say the accelerating pre-control moment and the braking pre-control moment. A setpoint speed differential for the controller is calculated from the limited pre-control moments while making allowance for the inertias of the input side. Alternatively, they may be taken over directly from the pre-control.

In order to ensure a synchronization of the flanks of the gear teeth and not prolong it unnecessarily, the setpoint speed differential must not become less than or equal to zero. Therefore, the setpoint speed differential is limited gear-dependently to small speed differentials. This also means that small energy inputs due to the reduction of a residual speed differential as a result of the moment of inertia are accepted, in order to achieve a better dynamic performance.

In order to further reduce the energy input during the synchronization, and consequently the jolting and the noise, the gradient of the torque is slowed in the second region 106 during active inertia control. As a result, the coupling moment at the point in time when the flanks of the gear teeth change is reduced. With the end of the inertia control, the region 106 is directly exited and the gradient of the torque of the third region 107 that is known from the prior art is used.

In order that the inertia controller does not make any further interventions after the synchronization of the flanks of the gear teeth, the inertia control may for example be terminated when the inertia overcome is equal to the theoretical inertia. The inertia overcome may for example be determined from the integral of the actual speed differential.

Alternatively or in addition, a change in the actual speed differential may be observed. If a spontaneous reduction of the speed differential due to an engagement with the opposite flank and the associated reduction of the moment of inertia is detected, the control may likewise be ended.

A dependable indicator of the flux of force produced is the change in the gradient of the output speed. This comprises the information that torque has been introduced or taken out through the input side. This state can only be brought about by a change of the flanks of the gear teeth.

It is also possible that the inertia control is terminated after a certain period of time, which is defined as the maximum period of time required. This especially prevents an excessive delay time, which for many drivers is undesired.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for controlling an engine in a motor vehicle, wherein the engine is connected to at least one axle of the motor vehicle via a drivetrain, the method comprising:
   determining a theoretical inertia of the drivetrain during a change of an operating mode of the engine;
   detecting an actual inertia in the drivetrain during the change of the operating mode;
   increasing a rotational speed of the engine in response to detecting the actual inertia;
   detecting an inertia overcome;
   determining a difference between the theoretical inertia and the inertia overcome; and
   reducing, in response to the difference between the theoretical inertia and the inertia overcome being less than a threshold value, the rotational speed of the engine,
   wherein pre-setpoint values are determined by a pre-control for pre-controlling a torque of the engine to overcome inertia, and
   wherein, during the increasing the rotational speed of the engine in response to detecting the actual inertia, the pre-setpoint values are converted into engine torque setpoint values.

2. The method as claimed in claim 1, wherein the reducing the rotational speed of the engine comprises adapting the rotational speed of the engine to an output speed of the drivetrain.

3. The method as claimed in claim 1, wherein the rotational speed of the engine is increased and/or reduced in dependence on the difference between the theoretical inertia and the inertia overcome.

4. The method as claimed in claim 1, wherein the detecting the actual inertia comprises comparing a gradient of an input speed with a gradient of an output speed.

5. The method as claimed in claim 4, wherein the drivetrain comprises a transmission, and wherein the detecting the actual inertia comprises determining the input speed as a transmission input speed in a slipping state of the transmission.

6. The method as claimed in claim 4, wherein the drivetrain comprises a transmission, and wherein the detecting the actual inertia comprises determining the input speed as a rotational speed of the engine in a non-slipping state of the transmission.

7. The method as claimed in claim 1, wherein the theoretical inertia is determined in dependence on an engaged gear of the transmission of the drivetrain.

8. The method as claimed in claim 1, wherein second pre-setpoint values are determined by the pre-control for pre-controlling a torque of the engine to provide for the rotational speed of the engine to be adapted to an output speed of the drivetrain, and
wherein, during the reducing the rotational speed of the engine, the second pre-setpoint values are converted into second engine torque setpoint values.

9. The method as claimed in claim 1, wherein detecting the actual inertia comprises detecting that a torque transmitted by the engine lies within a gear-dependent torque range.

10. The method as claimed in claim 1, wherein the pre-setpoint values are converted into engine torque setpoint values by a proportional-integral-derivative (PID) controller.

11. The method as claimed in claim 8, wherein the pre-setpoint values and the second pre-setpoint values are converted into, respectively, the engine torque setpoint values and the second engine torque setpoint values by a proportional-integral-derivative (PID) controller.

12. The method as claimed in claim 1, wherein the pre-controlling the torque of the engine to overcome inertia uses parameters that describe the geometrical inertia.

13. The method as claimed in claim 1, wherein the reducing the rotational speed of the engine is performed at a speed reversal point.

14. The method as claimed in claim 13, wherein the speed reversal point is calculated from a ratio of pre-control moments.

15. The method as claimed in claim 14, wherein the ratio of pre-control moments is a ratio of an accelerating pre-control moment and a braking pre-control moment.

16. A motor vehicle, comprising:
a controller configured to perform the method as claimed in claim 1;
the engine;
the drivetrain; and
at least one axle driven by the engine via the drivetrain.

* * * * *